(12) United States Patent
Berg

(10) Patent No.: US 11,390,127 B1
(45) Date of Patent: Jul. 19, 2022

(54) GARBAGE CAN HITCH AND GARBAGE CAN HAVING A BUILT-IN HITCH

(71) Applicant: THXC, LLC, Eugene, OR (US)

(72) Inventor: Lanny Berg, Eugene, OR (US)

(73) Assignee: THXC, LLC, Eugene, OR (US)

( * ) Notice: Subject to any disclaimer, the term of this patent is extended or adjusted under 35 U.S.C. 154(b) by 0 days.

(21) Appl. No.: 17/116,899

(22) Filed: Dec. 9, 2020

Related U.S. Application Data

(60) Provisional application No. 62/954,484, filed on Dec. 28, 2019.

(51) Int. Cl.
*B60D 1/14* (2006.01)
*B62B 5/00* (2006.01)
*B60D 1/00* (2006.01)

(52) U.S. Cl.
CPC ............ *B60D 1/143* (2013.01); *B62B 5/0079* (2013.01); *B60D 2001/001* (2013.01)

(58) Field of Classification Search
CPC .......... B60D 1/06; B60D 1/065; B62B 5/0079
See application file for complete search history.

(56) References Cited

U.S. PATENT DOCUMENTS

| | | | | |
|---|---|---|---|---|
| 4,199,161 | A * | 4/1980 | Nieminen | B62B 3/104 280/47.24 |
| 5,350,209 | A * | 9/1994 | Van Mullen | B60D 1/065 280/512 |
| 6,113,125 | A * | 9/2000 | Colibert | B60D 1/60 280/508 |
| 6,725,855 | B1 | 4/2004 | Brennan | |
| 8,998,555 | B1 | 4/2015 | Ingham | |
| 9,586,637 | B2 | 3/2017 | Kentner | |
| 2004/0164517 | A1* | 8/2004 | Lewy | B65F 1/1473 280/493 |
| 2004/0232184 | A1* | 11/2004 | Moen | B65F 1/1468 224/510 |
| 2005/0023796 | A1* | 2/2005 | Rasmussen | B60D 1/00 280/400 |
| 2009/0283987 | A1* | 11/2009 | Long | B65F 1/1468 280/498 |

FOREIGN PATENT DOCUMENTS

| | | | | |
|---|---|---|---|---|
| AU | 2015100989 A4 * | 8/2015 | | |
| DE | 3502701 C2 * | 4/1990 | ............... | B60D 1/60 |
| GB | 2275035 A * | 8/1994 | ............... | B60D 1/52 |

* cited by examiner

*Primary Examiner* — Kevin Hurley
(74) *Attorney, Agent, or Firm* — Renaissance IP Law Group, LLP; David A. Crowther

(57) ABSTRACT

A garbage can hitch includes a base section, and a grab handle coupled to the base section. An attachment arm is coupled to the base section, and attaches to a garbage can. A receptacle is disposed within the base section, and configured to receive a hitch ball of a vehicle. A semi-cylindrical well is disposed within the base section, and configured to receive a handle bar of the garbage can. A garbage can includes a sidewall. The garbage can may include a built-in hitch attached to the sidewall. The built-in hitch includes a base section and a receptacle disposed within the base section. The receptacle receives a hitch ball of the vehicle. The gravity-enhanced configuration provides downward levered pressure on the hitch ball when the garbage can is towed, such that the hitch is kept securely linked to the hitch ball, even when the vehicle drives over bumpy or gravelly roads.

17 Claims, 15 Drawing Sheets

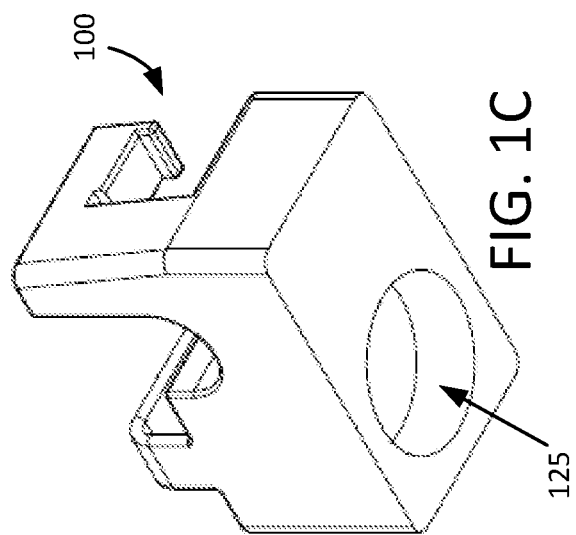
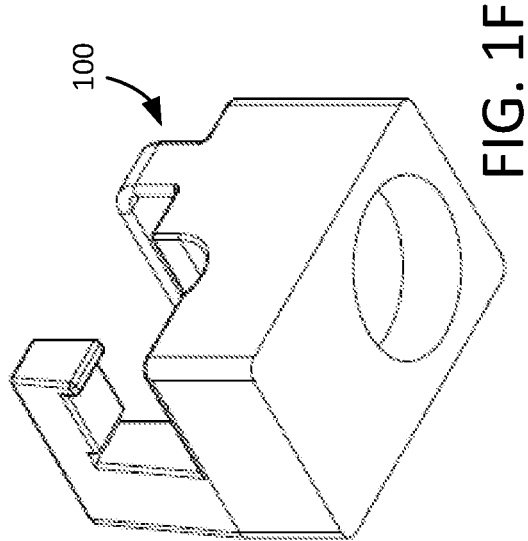
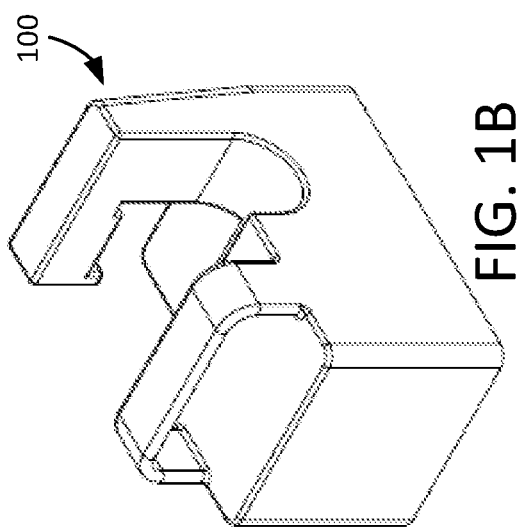
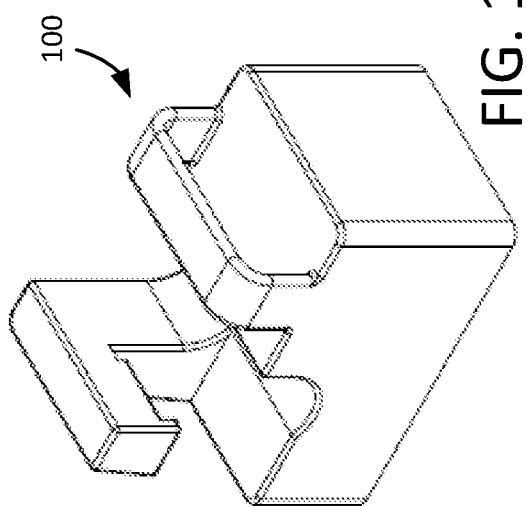
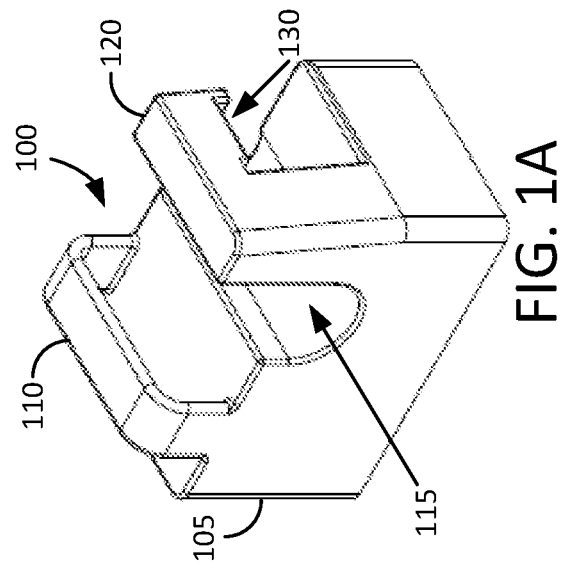
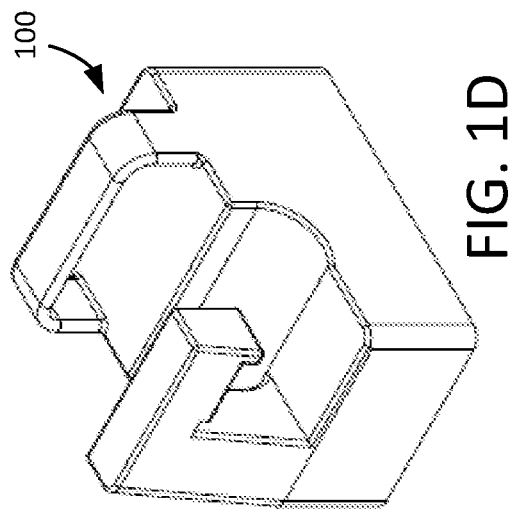

GARBAGE CAN HITCH AND GARBAGE CAN HAVING A BUILT-IN HITCH

RELATED APPLICATION DATA

This application claims the benefit of U.S. Provisional Patent Application No. 62/954,484, filed on Dec. 28, 2019, which is hereby incorporated by reference.

TECHNICAL FIELD

This application pertains to hitch devices, and more particularly, to a single-part garbage can hitch for facilitating the movement of a garbage can using a vehicle, and a garbage can having a built-in hitch.

BACKGROUND

Some people live in a home with a large set back from a main road, such that the garbage must be pulled along a driveway, which in some cases can extend for hundreds of feet. Usually in such circumstances, the driveway is made of gravel or dirt, making it even more difficult to drag the garbage can, particularly when the garbage can is full of garbage. Inclement weather can also increase the human misery of manually pulling a garbage can full of garbage up or down a long, muddy road.

BRIEF DESCRIPTION OF THE DRAWINGS

FIGS. 1A through 1F illustrate a single-part garbage can hitch from various view angles in accordance with various embodiments of the present inventive concept.

Figure 2:
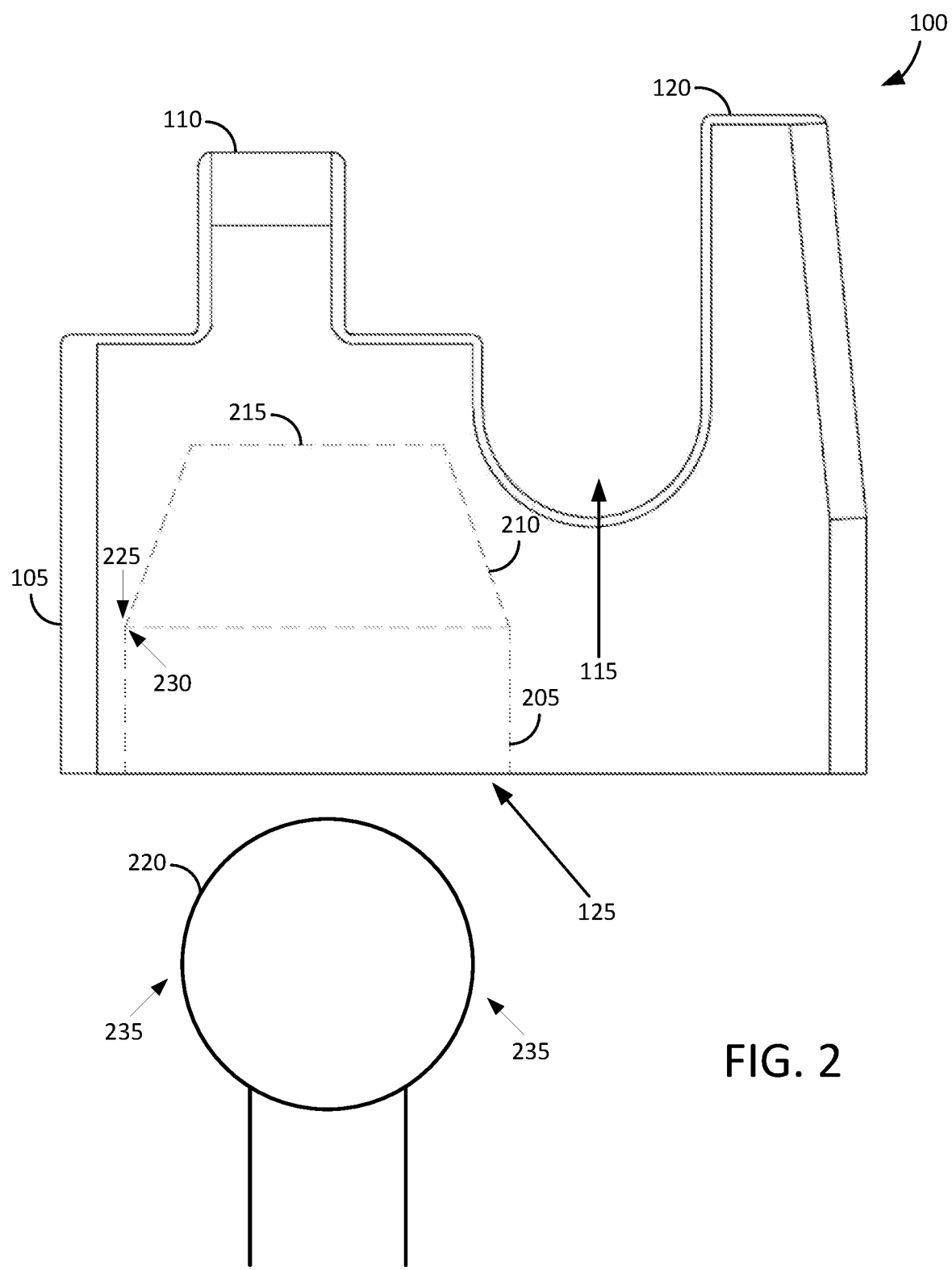
FIG. 2 illustrates a close-up side view of the single-part garbage can hitch of FIGS. 1A through 1F in accordance with various embodiments of the present inventive concept.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first block could be termed a second block, and, similarly, a second block could be termed a first block, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIGS. 1A through 1F illustrate a single-part garbage can hitch 100 from various view angles in accordance with various embodiments of the present inventive concept. The single-part garbage can hitch 100 can be made of a single contiguous molded part. In an alternate embodiment, the single-part garbage can hitch 100 can be made of multiple separate parts that are combined (e.g., attached to each other) to form a single functional part. The single-part garbage can hitch 100 is preferably made of plastic because it is lightweight and strong, but it will be understood that the single part garbage can hitch 100 can be made of any suitable hard material such as metal, fiber glass, wood, composite materials, or the like. In some embodiments, the single-part garbage can hitch 100 is manufactured using a plastic injection mold. In some embodiments, the single-part garbage can hitch 100 is manufactured using a 3D printer.

As shown in FIG. 1A, the single-part garbage can hitch 100 can include a grab handle 110. The grab handle 100 has proportions such that any typical human hand can easily grasp the single-part garbage can hitch 100 using the grab handle 110. The single-part garbage can hitch 100 can include a base section 105. In some embodiments, the base section 105 is substantially in the form of a block. However, it will be understood that the base section 105 can have other suitable shapes without departing from the inventive aspects described herein.

The single-part garbage can hitch 100 can include an attachment arm 120, which can be used to attach to a center cross stiffener beam of a garbage can, as further described below. The attachment arm 120 can attach to multiple standard cross stiffener beam sizes. The attachment arm 120 can include a recess 130 located at an underside thereof. The single-part garbage can hitch 100 can include a semi-cylindrical well 115 located adjacent the attachment arm 120, and between the attachment arm 120 and the grab handle 110. The semi-cylindrical well 115 can be filled by a handle bar of a garbage can as further described below.

As shown in FIG. 1C, the single-part garbage can hitch 100 can include a receptacle 125 having a downwardly facing opening. The receptacle 125 can be located within the base section 105 of the single-part garbage can hitch 100. The receptacle 125 can be shaped to receive a trailer hitch ball of a vehicle, as further described below.

FIG. 2 illustrates a close-up side view of the single-part garbage can hitch 100 of FIGS. 1A through 1F in accordance with various embodiments of the present inventive concept. Some of the reference numerals of FIG. 2 are described above, and therefore, a detailed description of these elements is not necessarily repeated. The receptacle 125 can include a hollow cylindrical section 205 and a hollow conical frustum section 215 having a tapered wall 210. An end 225 of the conical frustum section 215 may meet at an end 230 of the cylindrical section 205, thereby forming a contiguous open receptacle 125 within the base section 105. The cylindrical section 205 can function to engage with a surface 235 of a hitch ball 220. The frustum section 215 can function to engage with the surface 235 of the hitch ball 220. For example, the tapered wall can function to keep the hitch ball 220 substantially centered within the receptacle 125. The receptacle 125 can fit over any standard sized trailer hitch ball (e.g., 220), such as 1⅞ inch, 2 inch, and 2 5/16 inch hitch balls. It will be understood that in alternate embodiments, the receptacle 125 can take other shapes that are suitable for being fit over any standard sized trailer hitch ball, without departing from the inventive aspects disclosed herein. For example, the receptacle 125 can have a hemispherical shape to receive the trailer hitch ball 220. In some embodiments, the receptacle 125 has a box shape, a hexagonal shape, a triangular shape, or the like.

The single-part garbage can hitch 100 enables an easy on-off motion for smooth and efficient usability. For example, the shape of the receptacle 125 enables a user to fit the receptacle 125 over the hitch ball 220 using an easy place and drop motion, or to remove the receptacle 125 from the hitch ball 220 using an easy lift and remove motion. More specifically, the user can grasp the grab handle 110, position the base section 105 over the trailer hitch ball 220, and release grip of the grab handle 110 so that the single-part garbage can hitch 100 rests on the hitch ball 220 of a vehicle. A garbage can first be attached to the single-part garbage can hitch 100, as further described below, and then the single-part garbage can hitch 100 can be placed onto to the hitch ball 220. Alternatively, the single-part garbage can hitch 100 can be placed onto to the hitch ball 220 first, followed by the garbage can being attached to the single-part garbage can hitch 100. The vehicle can then tow the garbage can, as further described below. When finished towing the garbage can, the user can grasp the grab handle 110, and lift the single-part garbage can hitch 100 off of the trailer hitch ball 220, and then detach the single-part garbage can hitch 100 from the garbage can. Alternatively, the single-part garbage can hitch 100 can be detached from the garbage can first, followed by the lifting of the single-part garbage can hitch 100 off of the trailer hitch ball 220.

Figure 3:
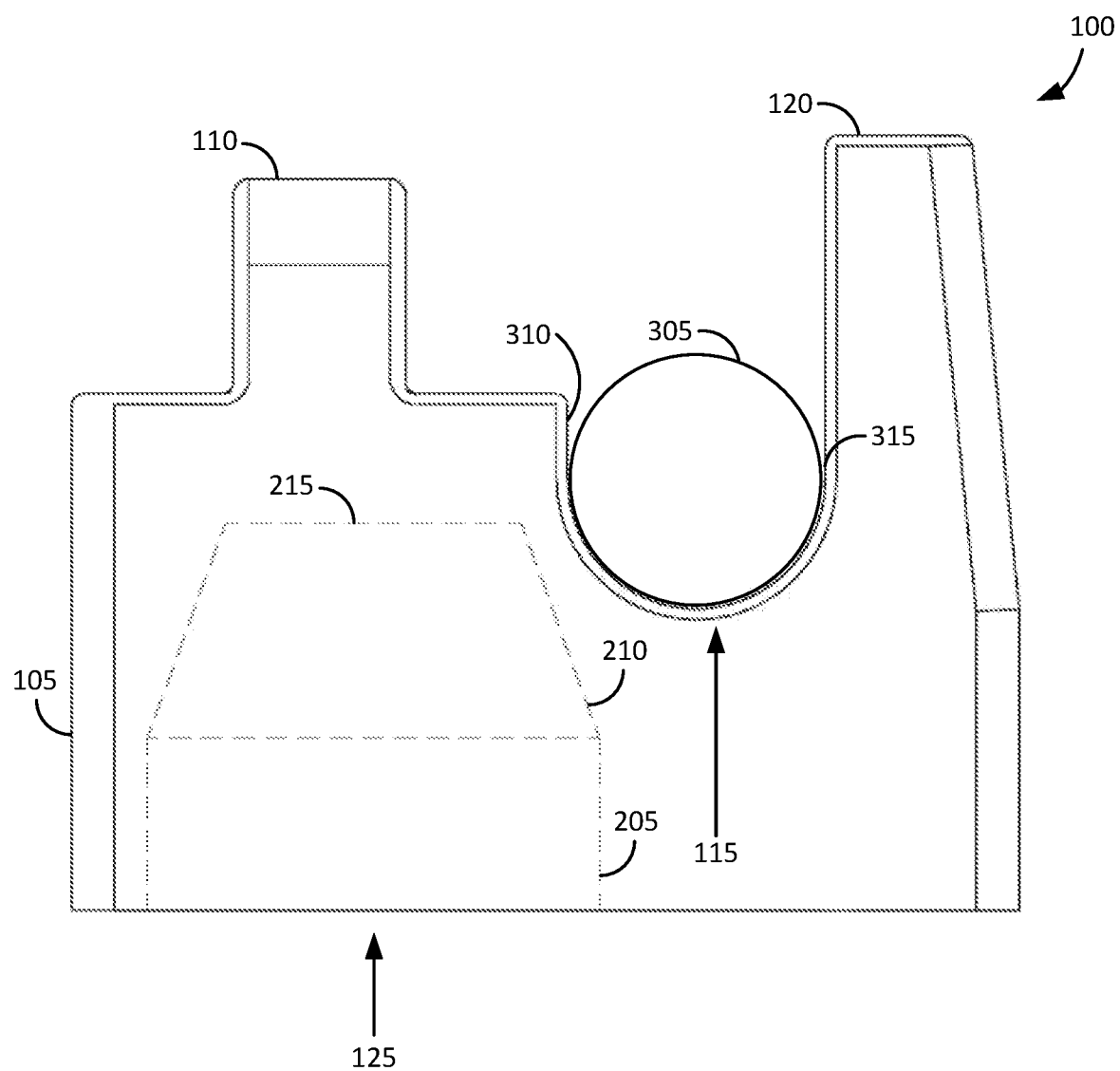
FIG. 3 illustrates a close-up side view of the single-part garbage can hitch of FIGS. 1A through 1F with a handle bar of a garbage can disposed in a semi-cylindrical well in accordance with various embodiments of the present inventive concept.

FIG. 3 illustrates a close-up side view of the single-part garbage can hitch 100 of FIGS. 1A through 1F with a handle bar 305 of a garbage can disposed in the semi-cylindrical well 115 in accordance with various embodiments of the present inventive concept. Some of the reference numerals of FIG. 3 are described above, and therefore, a detailed description of these elements is not necessarily repeated. As can be seen in FIG. 3, the handle bar 305 can fit within the semi-cylindrical well 115 sandwiched between the attachment arm 120 and an opposing wall 310 of the base section 105. In other words, the attachment arm 120 can include a first sidewall 315 of the semi-cylindrical well 115, and the base section 105 can include the opposing sidewall 310 opposite the first sidewall 315 of the semi-cylindrical well 115. The handle bar 305 may freely twist within the semi-cylindrical well 115 as needed to secure the attachment arm 120 to the garbage can, as further explained below.

Figure 4:
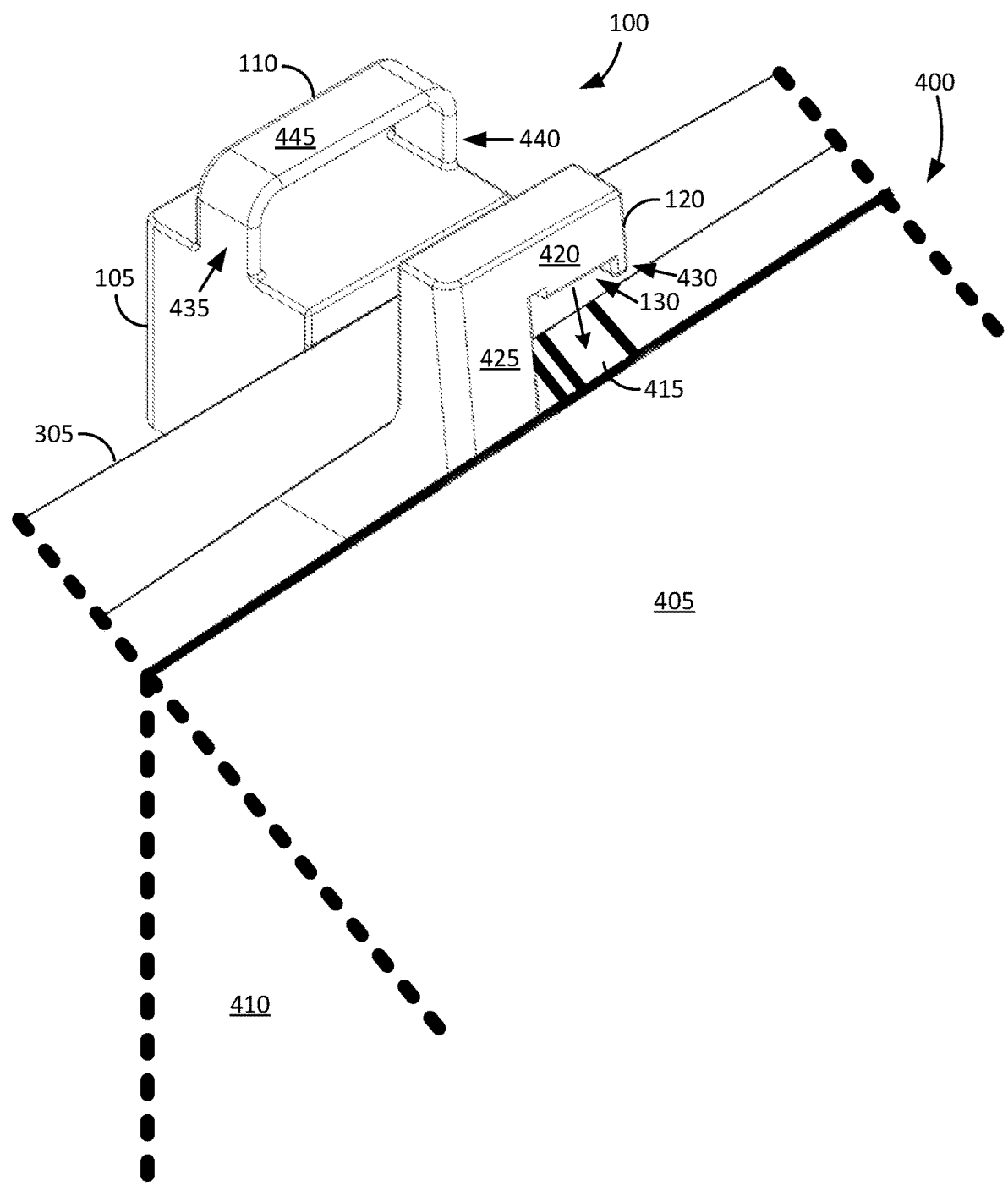
FIG. 4 illustrates a perspective view of the single-part garbage can hitch of FIGS. 1A through 1F being coupled with a garbage can in accordance with various embodiments of the present inventive concept.

FIG. 4 illustrates a perspective view of the single-part garbage can hitch 100 of FIGS. 1A through 1F being coupled with a garbage can 400 in accordance with various embodiments of the present inventive concept. Some of the reference numerals of FIG. 4 are described above, and therefore, a detailed description of these elements is not necessarily repeated. The dashed lines shown in FIG. 4 are example boundaries of a garbage can 400, but it will be understood that the relative dimensions of the garbage can 400 can be different without departing from the inventive concepts disclosed herein. The garbage can 400 can include a lid 405 and one or more sidewalls 410.

The attachment arm 120 of the single-part garbage can hitch 100 can slip over a center cross stiffener 415 of the garbage can 400, thereby securing the single-part garbage can hitch 100 to the garbage can 400 in such a way that prevents significant lateral movement of the single-part garbage can hitch 100. In other words, the single-part garbage can hitch 100 is prevented from sliding along the handle bar 305 of the garbage can 400. Put differently, the center cross stiffener 415 can prevent the single-part garbage can hitch 100 from sliding sideways, such that the single-part garbage can hitch 100 can be kept substantially in a fixed position at or near a center region of the handle bar 305 of the garbage can 400.

More specifically, the recess 130 of the attachment arm 120 can be disposed in a horizontal section 420 of the attachment arm 120, and can fit to the center cross stiffener 415. A lip 430 of the horizontal section 420 of the attachment arm 120, together with a vertical section 425 of the attachment arm 120, can prevent the single-part garbage can hitch 100 from any significant lateral movement along the handle bar 305. The dimensions of the recess 130 can be such that the attachment arm 120 fits snugly on the center cross stiffener 415. The single-part garbage can hitch 100 can fit most standard sized garbage cans. Nevertheless, in some embodiments, the center cross stiffener 415 can be provided in different sizes depending on the garbage can manufacturer. Multiple types of single-part garbage can hitches 100 with varying dimensions of the recess 130 in order to fit and attach to any center cross stiffener 415 may be used. In some embodiments, the size of the recess 130 of the single-part garbage can hitch 100 is adjustable such that it can fit over or otherwise attach to any sized center cross stiffener 415.

In some embodiments, the grab handle 110 can include a first vertical sidewall 435, a second vertical sidewall 440, and a horizontal wall 445 coupled to the first vertical sidewall 435 and to the second vertical sidewall 440. In some embodiments, the grab handle 110 is a material strap, a plastic strap, a rubber strap, or other suitable handle that is connected to the base section 105.

Figure 5:
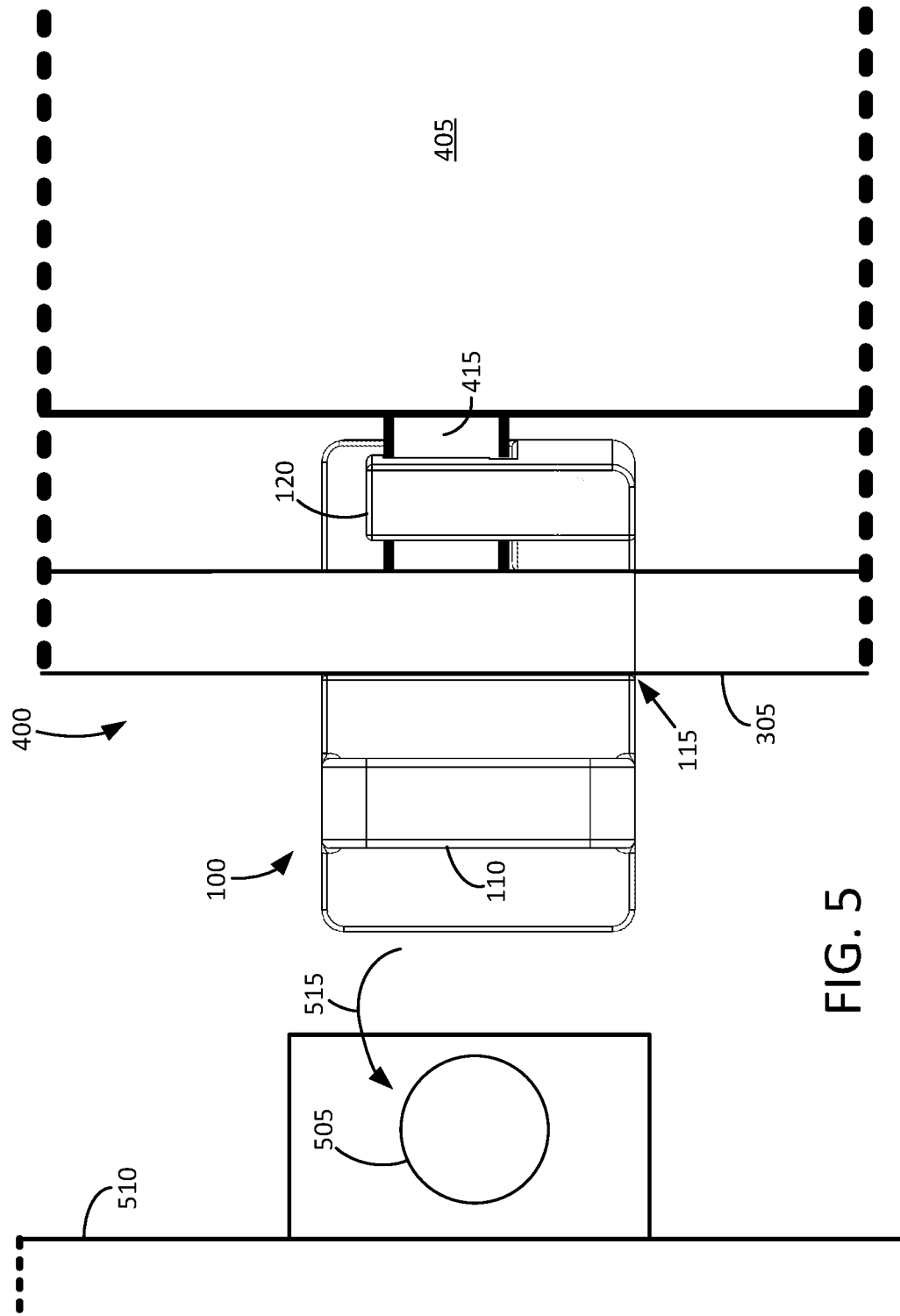
FIG. 5 illustrates a plan view of the single-part garbage can hitch of FIGS. 1A through 1F being coupled with a trailer hitch ball of a vehicle in accordance with various embodiments of the present inventive concept.

FIG. 5 illustrates a plan view of the single-part garbage can hitch 100 of FIGS. 1A through 1F being coupled with a trailer hitch ball 505 of a vehicle 510 in accordance with various embodiments of the present inventive concept. Some of the reference numerals of FIG. 5 are described above, and therefore, a detailed description of these elements is not necessarily repeated. The dashed lines shown in FIG. 5 are example boundaries of a garbage can 400 and the vehicle 510, but it will be understood that the relative dimensions of the garbage can 400 and the vehicle 510 can be different without departing from the inventive concepts disclosed herein. It will be understood that any type of vehicle 510 having a tow hitch ball can be used.

Once the single-part garbage can hitch 100 is engaged with the garbage can 400, it can be lowered onto the trailer hitch ball 505, as shown at 515. For example, the attachment arm 120 can be attached to the center cross stiffener 415 of the garbage can 400, and the handle bar 305 of the garbage can 400 can rest in the semi-cylindrical well 115 of the single-part garbage can hitch 100. Thereafter, the single-part garbage can hitch 100 can be grasped by the grab handle 110, and moved together with garbage can 400 toward and then over the trailer hitch ball 505. The weight of the garbage can 400 provides rigidity to the linkage, and once the single-part garbage can hitch 100 is attached to the hitch ball 500, the weight of the garbage can 400 is transferred to the vehicle 510. The load on the single-part garbage can hitch 100 itself is minimal. Because of the gravity-enhanced configuration providing downward levered pressure on the trailer hitch ball 505, the single-part garbage can hitch 100 is advantageously kept securely linked to the trailer hitch ball 505, even when the vehicle 510 drives over bumpy, gravelly, and/or dirt-based roads.

Figure 6:
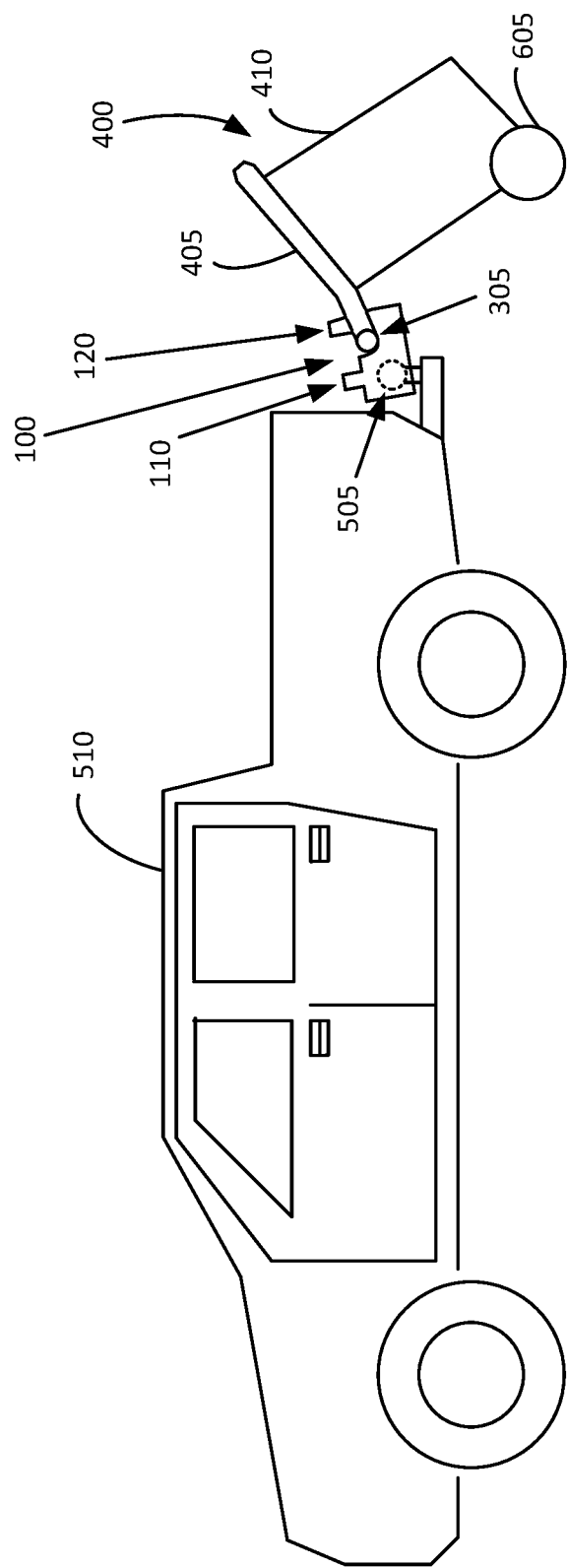
FIG. 6 illustrates a side view of the single-part garbage can hitch of FIGS. 1A through 1F coupling the garbage can with the trailer hitch ball of the vehicle in accordance with various embodiments of the present inventive concept.

FIG. 6 illustrates a side view of the single-part garbage can hitch 100 of FIGS. 1A through 1F coupling the garbage 400 can with the trailer hitch ball 505 of the vehicle 510 in accordance with various embodiments of the present inventive concept. Some of the reference numerals of FIG. 6 are described above, and therefore, a detailed description of these elements is not necessarily repeated.

The garbage can 400 can include one or more wheels 605. After the garbage can 400 has been linked to the vehicle 510 using the single-part garbage can hitch 100, the vehicle 510 can easily drag the garbage can 400 as the one or more wheels 605 of the garbage can 400 rotate on the ground. The weight of the garbage can 400 provides rigidity to the linkage, which keeps the single-part garbage can hitch 100 from coming off the hitch ball 505. After the garbage can 400 has been dragged to the end of the drive way, for example, the single-part garbage can hitch 100 can be lifted from the hitch ball 505. The single-part garbage can hitch 100 can then be easily detached from the garbage can 400 by disengaging the attachment arm 120. Alternatively, the garbage can 400 can first be disengaged from the single-part garbage can hitch 100, and then the single-part garbage can hitch 100 can be lifted from the hitch ball 505. At no point does the garbage can 400 need to be lifted off the ground.

Figure 7:
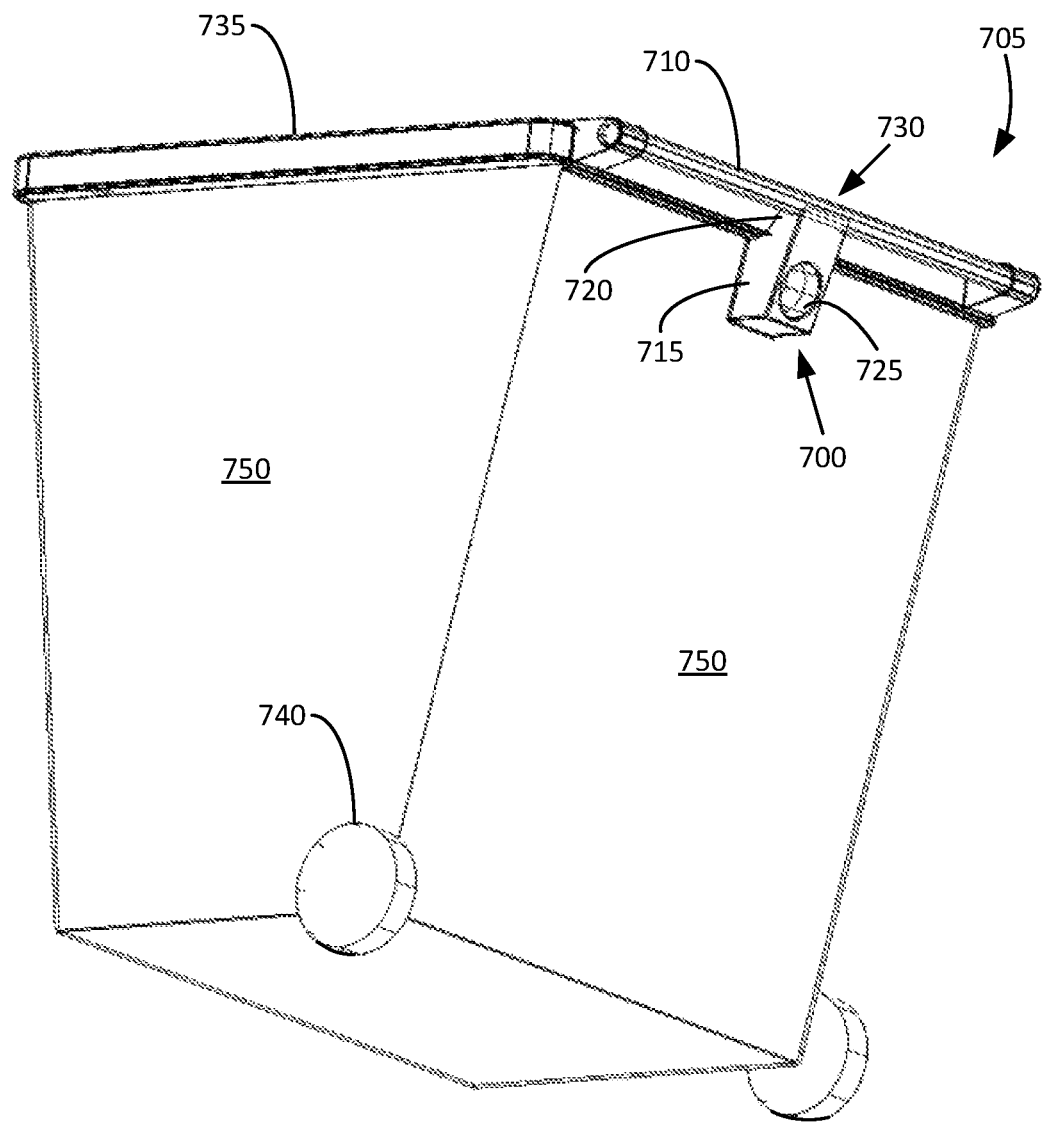
FIG. 7 illustrates a perspective view of a garbage can having a built-in hitch for coupling the garbage can with the trailer hitch ball of the vehicle in accordance with various embodiments of the present inventive concept.

FIG. 7 illustrates a perspective view of a garbage can 705 having a built-in hitch 700 for coupling the garbage can 705 with the trailer hitch ball (e.g., 505 of FIG. 5) of the vehicle (e.g., 510 of FIG. 5) in accordance with various embodiments of the present inventive concept. The built-in hitch 700 can be injection molded into the garbage can 705 itself. In an alternative embodiment, the built-in hitch 700 can be permanently attached to the garbage can 705. In yet another embodiment, the built-in hitch 700 can be removably attached to the garbage can 705. The built-in hitch 700 can simultaneously act as a stiffener for the handle bar 710 of the garbage can 705. In some embodiments, the built-in hitch 700 is manufactured separately from the garbage can 705, and then permanently or temporarily attached to the garbage can 705. The attachment can be accomplished using screws, adhesives, welding, or the like.

The built-in hitch 700 can include a base section 715. In some embodiments, the base section 715 is substantially in the form of a block. However, it will be understood that the base section 715 can have other suitable shapes without departing from the inventive aspects described herein. The built-in hitch 700 can include an upper pedestal 720 having a semi-cylindrical well 730 disposed therein. The upper pedestal 720 and well 730 can receive, hold, and/or provide structural support to the handle bar 710. In other words, the handle bar 710 can fit at least partially into, and be held at least partially within, the semi-cylindrical well 730 of the upper pedestal 720. In some embodiments, the handle bar 710 is free to rotate within the semi-cylindrical well 730 when a lid 735 of the garbage can 705 is opened or closed. In some embodiments, the handle bar 710 does not rotate, but is otherwise fixed or stationary within the well 730. The garbage can 700 can include one or more sidewalls (e.g., 750). The base section 715 can be attached to one of the sidewalls 750.

The built-in hitch 700 can include a receptacle 725. The receptacle 725 can be located within the base section 715 of the built-in hitch 700. The receptacle 725 can be shaped to receive a trailer hitch ball of a vehicle, as further described below. The garbage can 705 can include one or more wheels 740. After the garbage can 705 has been linked to the vehicle (e.g., 510 of FIG. 5) using the built-in hitch 700, the vehicle 510 can easily drag the garbage can 705 as the one or more wheels 740 of the garbage can 705 rotate on the ground.

Figure 8:
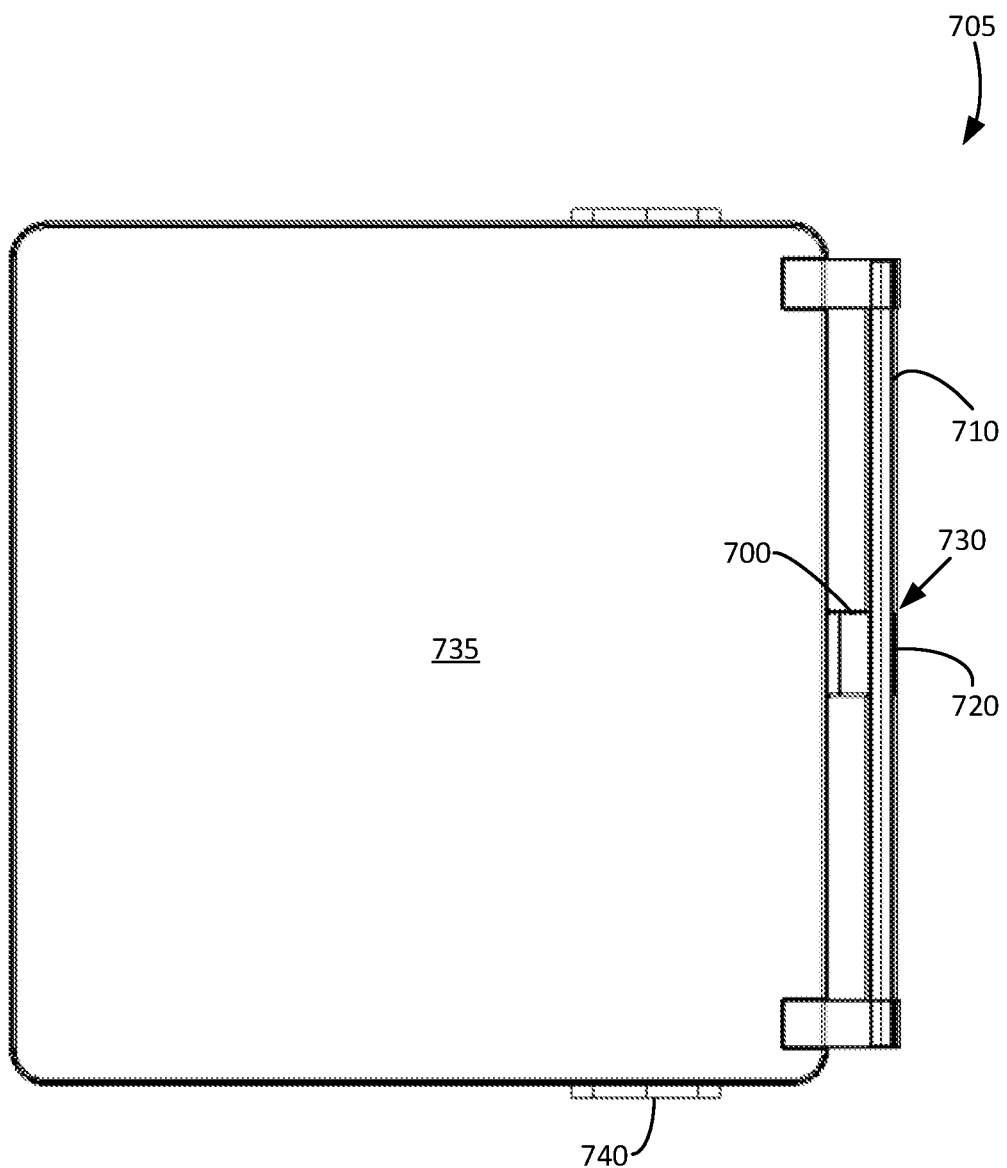
FIG. 8 illustrates a plan view of the garbage can having the built-in hitch for coupling the garbage can with the trailer hitch ball of the vehicle in accordance with various embodiments of the present inventive concept.

FIG. 8 illustrates a plan view of the garbage can 705 having the built-in hitch 700 for coupling the garbage can 705 with the trailer hitch ball (e.g., 505 of FIG. 5) of the vehicle (e.g., 510 of FIG. 5) in accordance with various embodiments of the present inventive concept. Some of the reference numerals of FIG. 8 are described above, and therefore, a detailed description of these elements is not necessarily repeated. The handle bar 710 can sit within the semi-cylindrical well 730 of the upper pedestal 720 of the built-in hitch 700 of the garbage can 705. In some embodiments, the handle bar 710 is fixed or stationary within the well 730. In some embodiments, the handle bar 710 can rotate within the well 730. As can be seen in FIG. 8, the built-in hitch 700 can take the place of a cross stiffener beam. In other words, the garbage can 705 need not have a cross stiffener beam because the built-in hitch can provide a dual function of structural support and the ability to attach to a ball hitch of a vehicle. In some embodiments, both a cross stiffener beam (e.g., 415 of FIG. 4) and the built-in hitch 700 are part of the garbage can 705.

Figure 9:
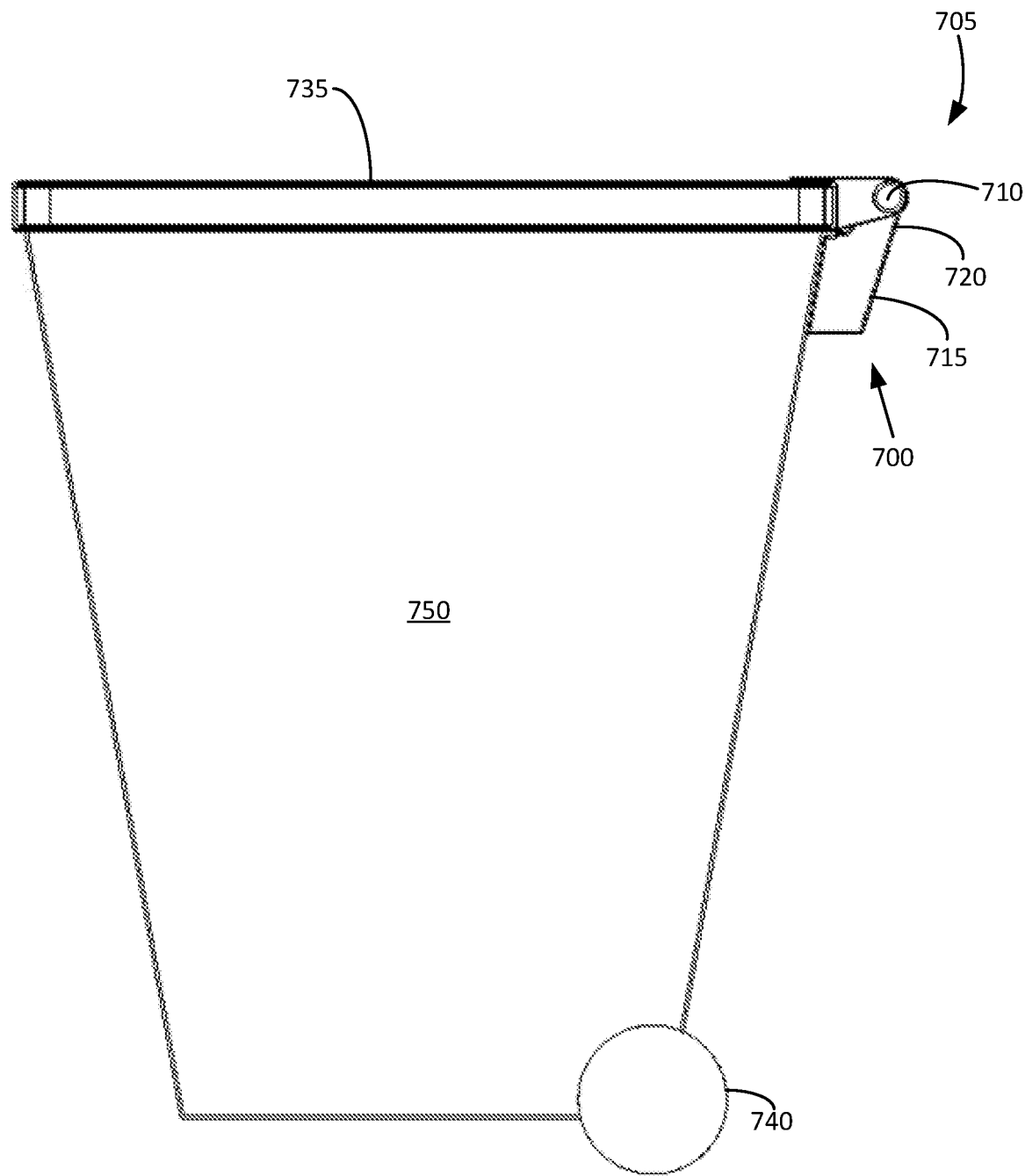
FIG. 9 illustrates a side view of the garbage can having the built-in hitch for coupling the garbage can with the trailer hitch ball of the vehicle in accordance with various embodiments of the present inventive concept.

FIG. 9 illustrates a side view of the garbage can 705 having the built-in hitch 700 for coupling the garbage can 705 with the trailer hitch ball (e.g., 505 of FIG. 5) of the vehicle (e.g., 510 of FIG. 5) in accordance with various embodiments of the present inventive concept. Some of the reference numerals of FIG. 9 are described above, and therefore, a detailed description of these elements is not necessarily repeated. A side view of the base section 715 and the pedestal 720 of the built-in hitch 700 is shown in FIG. 9.

Figure 10:
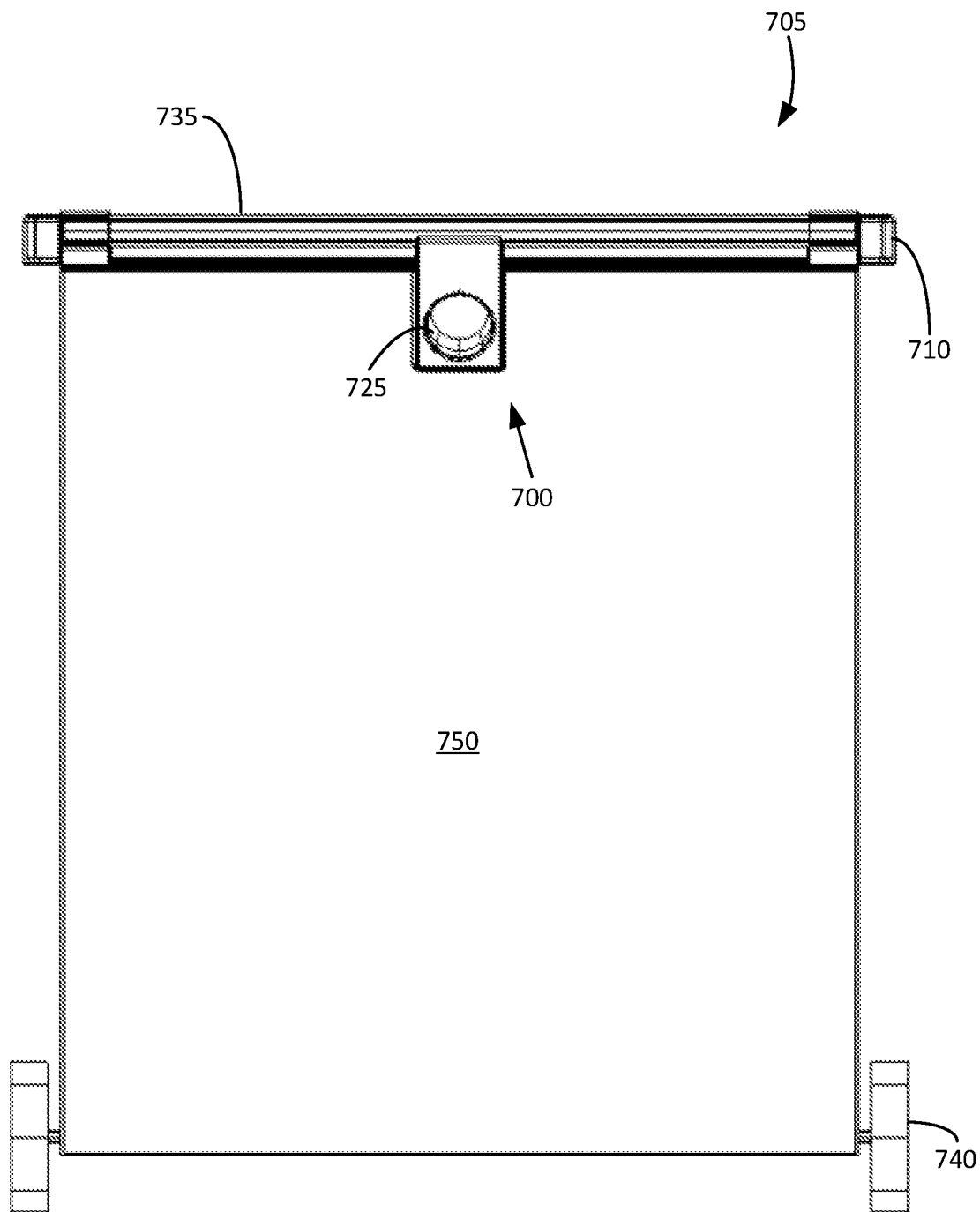
FIG. 10 illustrates another side view of the garbage can having the built-in hitch for coupling the garbage can with the trailer hitch ball of the vehicle in accordance with various embodiments of the present inventive concept.

FIG. 10 illustrates another side view of the garbage can 705 having the built-in hitch 700 for coupling the garbage can 705 with the trailer hitch ball (e.g., 505 of FIG. 5) of the vehicle (e.g., 510 of FIG. 5) in accordance with various embodiments of the present inventive concept. Some of the reference numerals of FIG. 10 are described above, and therefore, a detailed description of these elements is not necessarily repeated. The side view in FIG. 10 shows the receptacle 725, which can be placed over the trailer hitch (e.g., 505 of FIG. 5).

The receptacle 725 can include a hollow cylindrical section (e.g., 205 of FIG. 2) and a hollow conical frustum section (e.g., 215 of FIG. 2) having a tapered wall (e.g., 210 of FIG. 2). The receptacle 725 can fit over any standard sized trailer hitch ball (e.g., 220, 505), such as 1⅞ inch, 2 inch, and 2 5/16 inch hitch balls. It will be understood that in alternate embodiments, the receptacle 725 can take other shapes that are suitable for being fit over any standard sized trailer hitch ball, without departing from the inventive aspects disclosed herein. For example, the receptacle 725 can have a hemispherical shape to receive the trailer hitch ball (e.g., 220, 505). In some embodiments, the receptacle 725 has a box shape, a hexagonal shape, a triangular shape, or the like.

Figure 11:
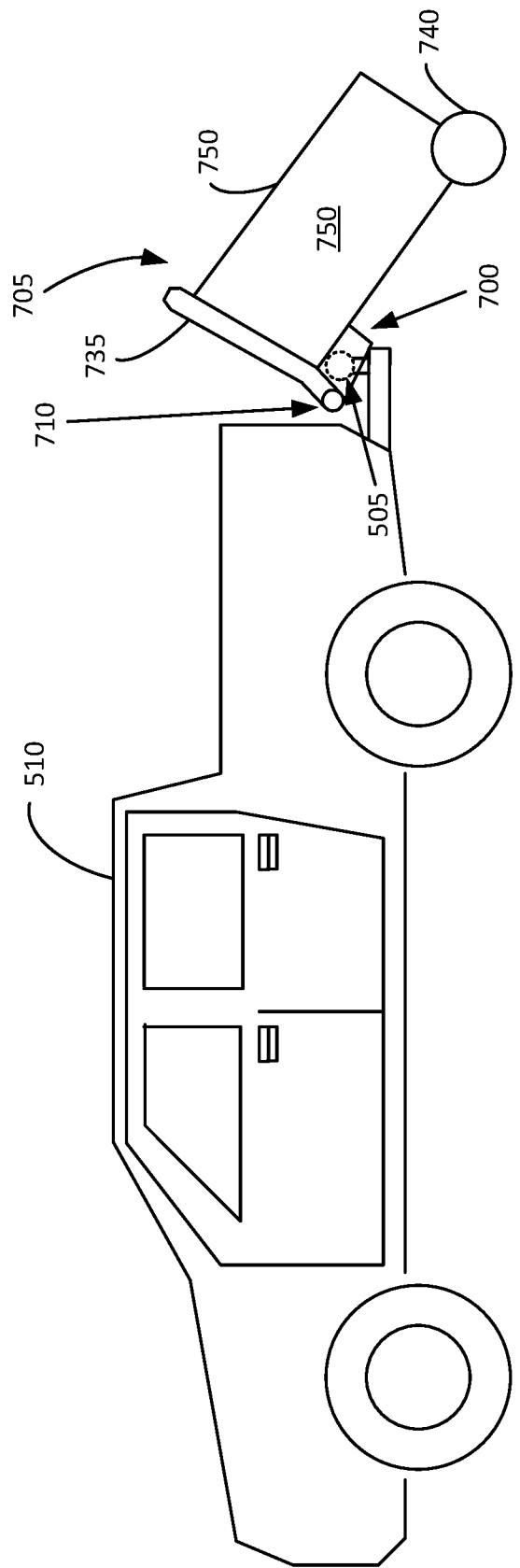
FIG. 11 illustrates yet another side view of the garbage can having the built-in hitch for coupling the garbage can with the trailer hitch ball of the vehicle in accordance with various embodiments of the present inventive concept.

FIG. 11 illustrates yet another side view of the garbage can 705 having the built-in hitch 700 for coupling the garbage can 705 with the trailer hitch ball 505 of the vehicle 510 in accordance with various embodiments of the present inventive concept. Some of the reference numerals of FIG. 11 are described above, and therefore, a detailed description of these elements is not necessarily repeated.

As shown in FIG. 11, the garbage can 705 having the built-in hitch 700 can be linked to the vehicle 510 for easy dragging. The garbage can 705 can include one or more wheels 740. After the garbage can 705 has been linked to the vehicle 510 using the built-in hitch 700, the vehicle 510 can easily drag the garbage can 705 as the one or more wheels 740 of the garbage can 705 rotate on the ground. The weight of the garbage can 705 provides rigidity to the linkage, which keeps the built-in hitch 700 from coming off the hitch ball 505. After the garbage can 705 has been dragged to the end of the drive way, for example, the garbage can 705 with the built-in hitch 700 can be lifted from the hitch ball 505. At no point does the garbage can 705 need to be lifted off the ground. Because of the gravity-enhanced configuration providing downward levered pressure on the trailer hitch ball 505, the built-in garbage can hitch 700 is advantageously kept securely linked to the trailer hitch ball 505, even when the vehicle 510 drives over bumpy, gravelly, and/or dirt-based roads. The built-in hitch 700 provides the added advantage of not being a separate part, i.e., of not having the step of attaching the hitch 700 to the garbage can 705, or removing the hitch 700 from the garbage can 705, since the hitch 700 is built-in to the garbage can 705.

The built-in hitch 700 and the garbage can 705 can together be made of a single contiguous molded part. In an alternate embodiment, the built-in hitch 700 can be made of multiple separate parts that are combined (e.g., attached to each other), and attached to the garbage can 705, to form a single functional part with the garbage can 705. The built-in hitch 700 is preferably made of plastic because it is lightweight and strong, but it will be understood that the built-in hitch 700 can be made of any suitable hard material such as metal, fiber glass, wood, composite materials, or the like. In some embodiments, the built-in hitch 700 and/or the garbage can 705 are manufactured using a plastic injection mold. In some embodiments, the built-in hitch 700 and/or the garbage can 705 are manufactured using a 3D printer.

Figure 12:
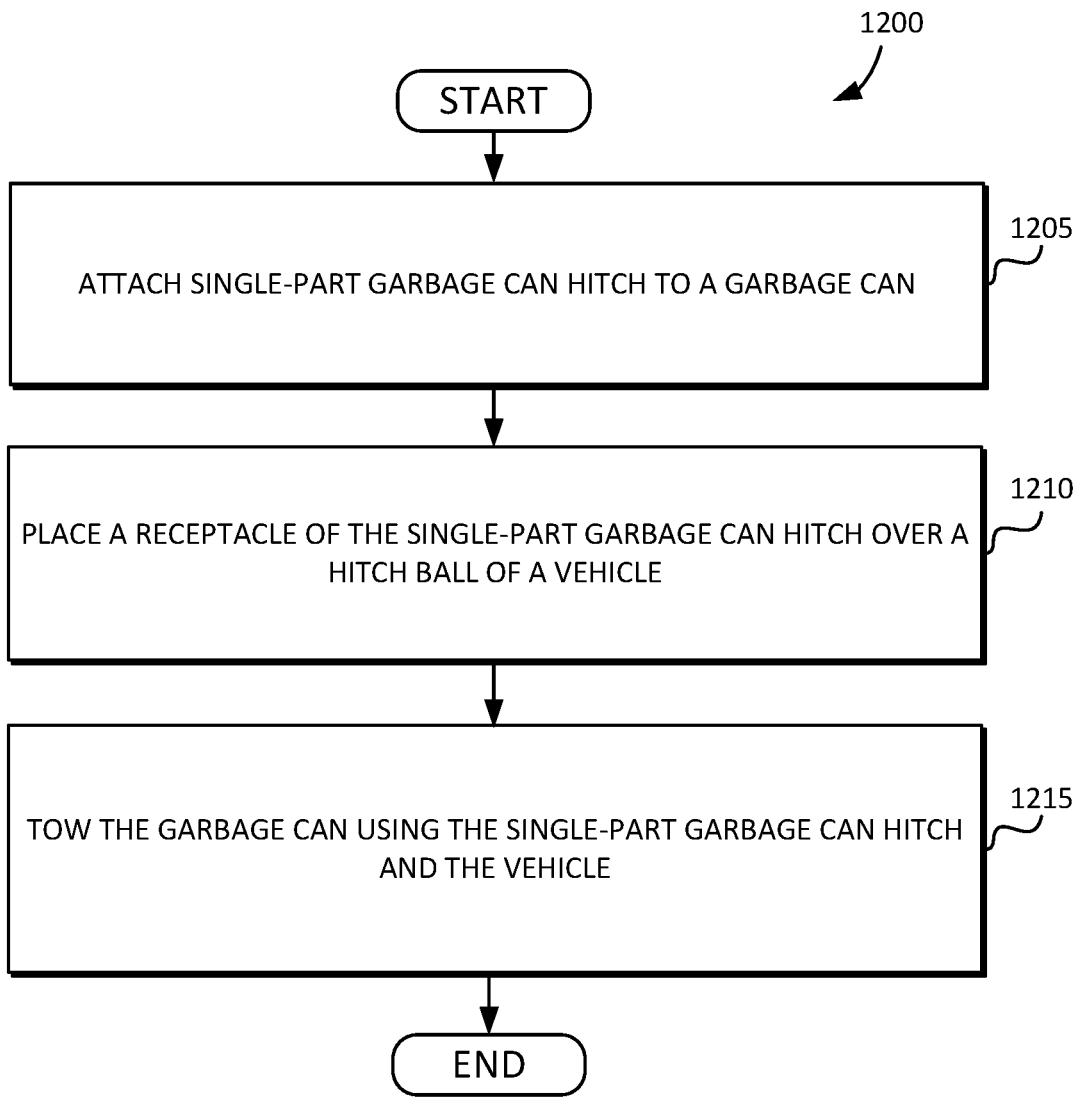
FIG. 12 is a flow diagram illustrating a technique for using a single-part garbage can hitch to tow a garbage can using a vehicle.

FIG. 12 is a flow diagram 1200 illustrating a technique for using a single-part garbage can hitch to tow a garbage can using a vehicle. At 1205, a single-part garbage can hitch can be attached to a garbage can. At 1210, a receptacle of the single-part garbage can hitch can be placed over a hitch ball of a vehicle, thereby securing the garbage can to the vehicle. At 1215, the garbage can may be towed using the single-part garbage can hitch and the vehicle.

Figure 13:
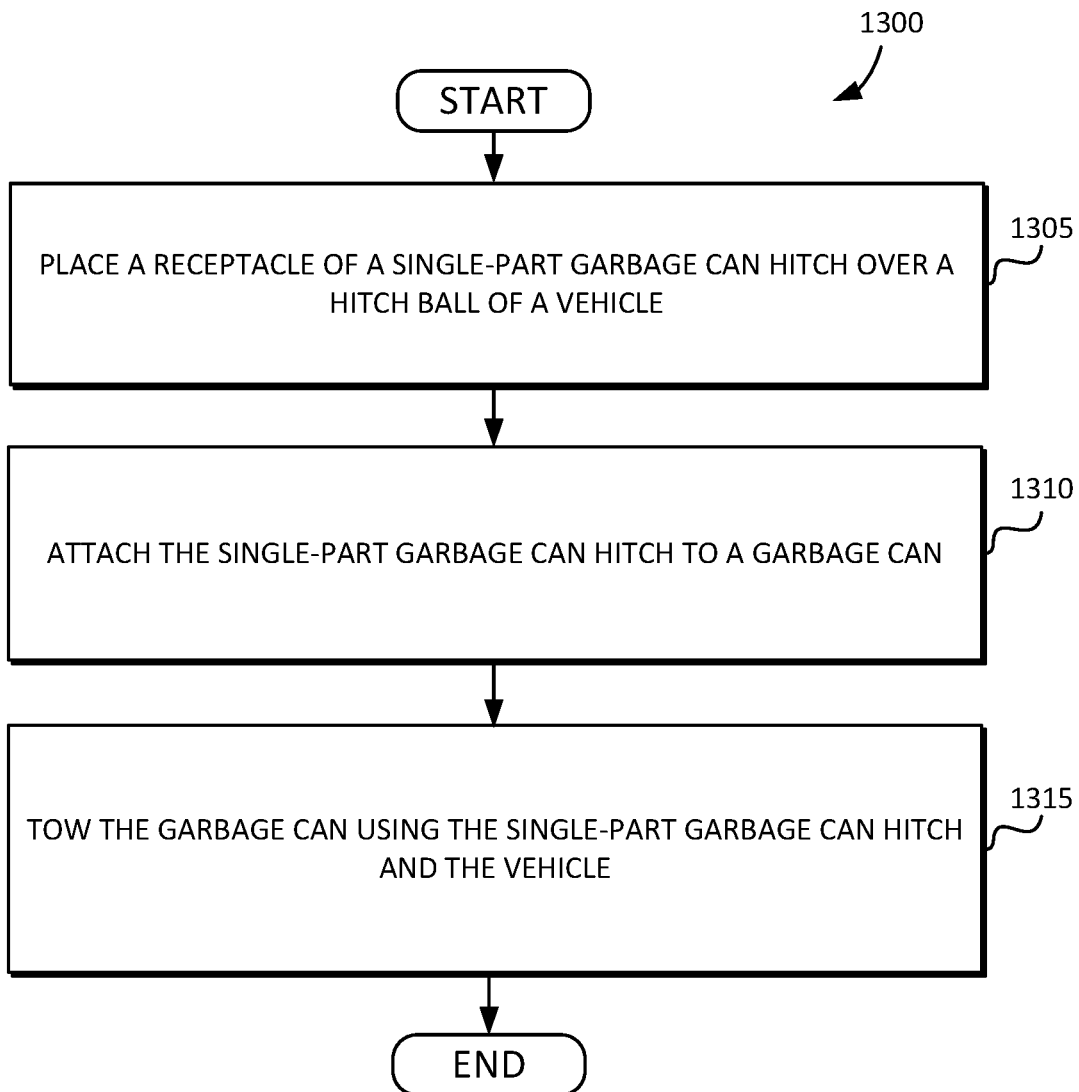
FIG. 13 is a flow diagram illustrating another technique for using a single-part garbage can hitch to tow a garbage can using a vehicle.

FIG. 13 is a flow diagram 1300 illustrating another technique for using the single-part garbage can hitch to tow the garbage can using the vehicle. At 1305, a receptacle of the single-part garbage can hitch can be placed over the hitch ball of the vehicle. At 1310, the single-part garbage can hitch can be attached to the garbage can, thereby securing the garbage can to the vehicle. At 1315, the garbage can may be towed using the single-part garbage can hitch and the vehicle.

Figure 14:
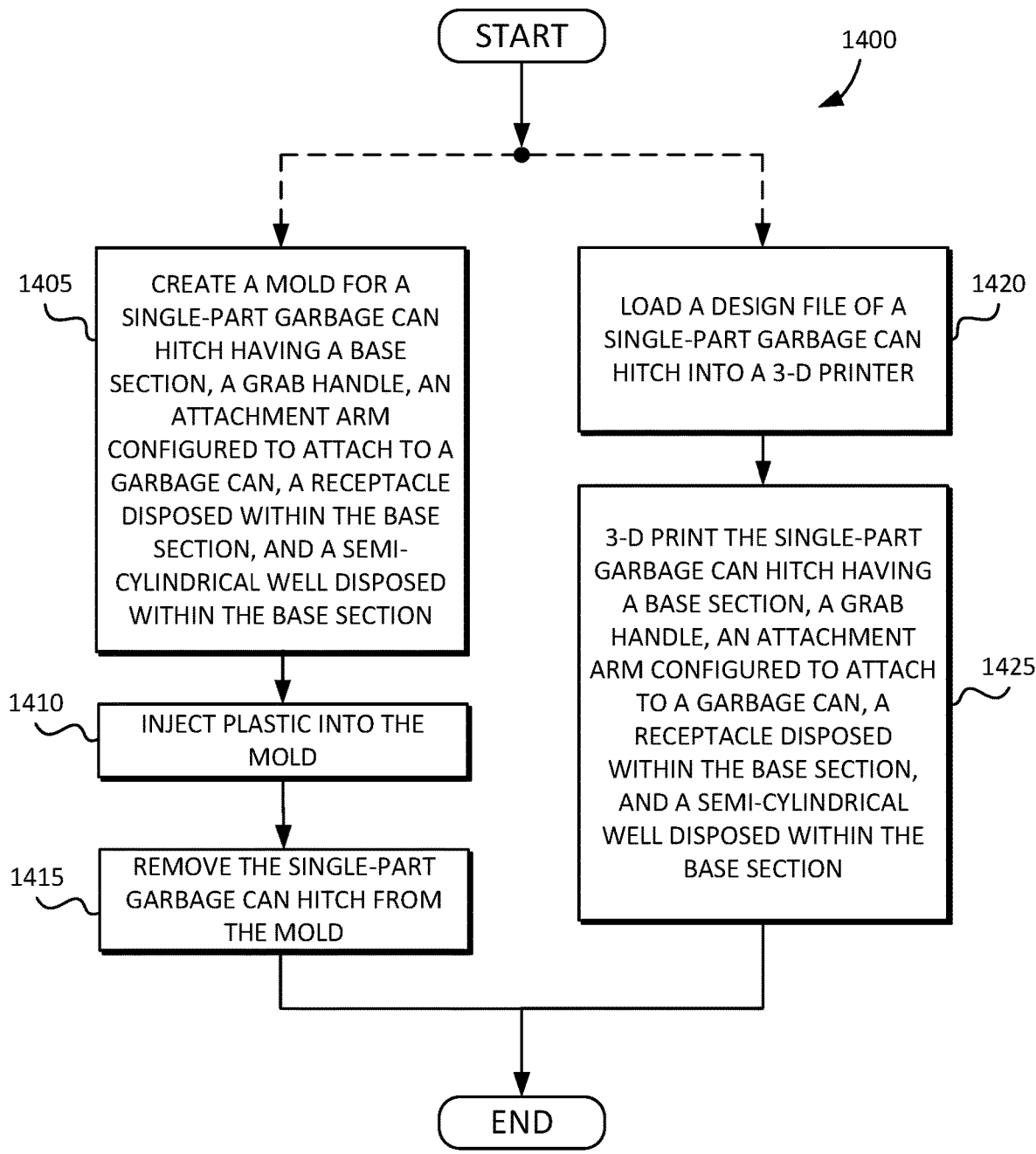
FIG. 14 is a flow diagram illustrating a technique for manufacturing a single-part garbage can hitch to tow a garbage can using a vehicle.

FIG. 14 is a flow diagram 1400 illustrating a technique for manufacturing a single-part garbage can hitch to tow a garbage can using a vehicle. At 1405, a mold can be created for a single-part garbage can hitch as described herein, e.g., having a base section, a grab handle, an attachment arm that is configured to attach to a garbage can, a receptacle disposed within the base section, and a semi-cylindrical well disposed within the base section. At 1410, plastic or another suitable hardening substance can be injected into the mold. At 1415, the single-part garbage can hitch can be removed from the mold.

Alternatively, at 1420, a design file of a single-part garbage can hitch as described herein can be loaded into a 3-D printer. At 1425, the 3-D printer can print the single-part garbage can hitch having, e.g., a base section, a grab handle, an attachment arm that is configured to attach to a garbage can, a receptacle disposed within the base section, and a semi-cylindrical well disposed within the base section.

Figure 15:
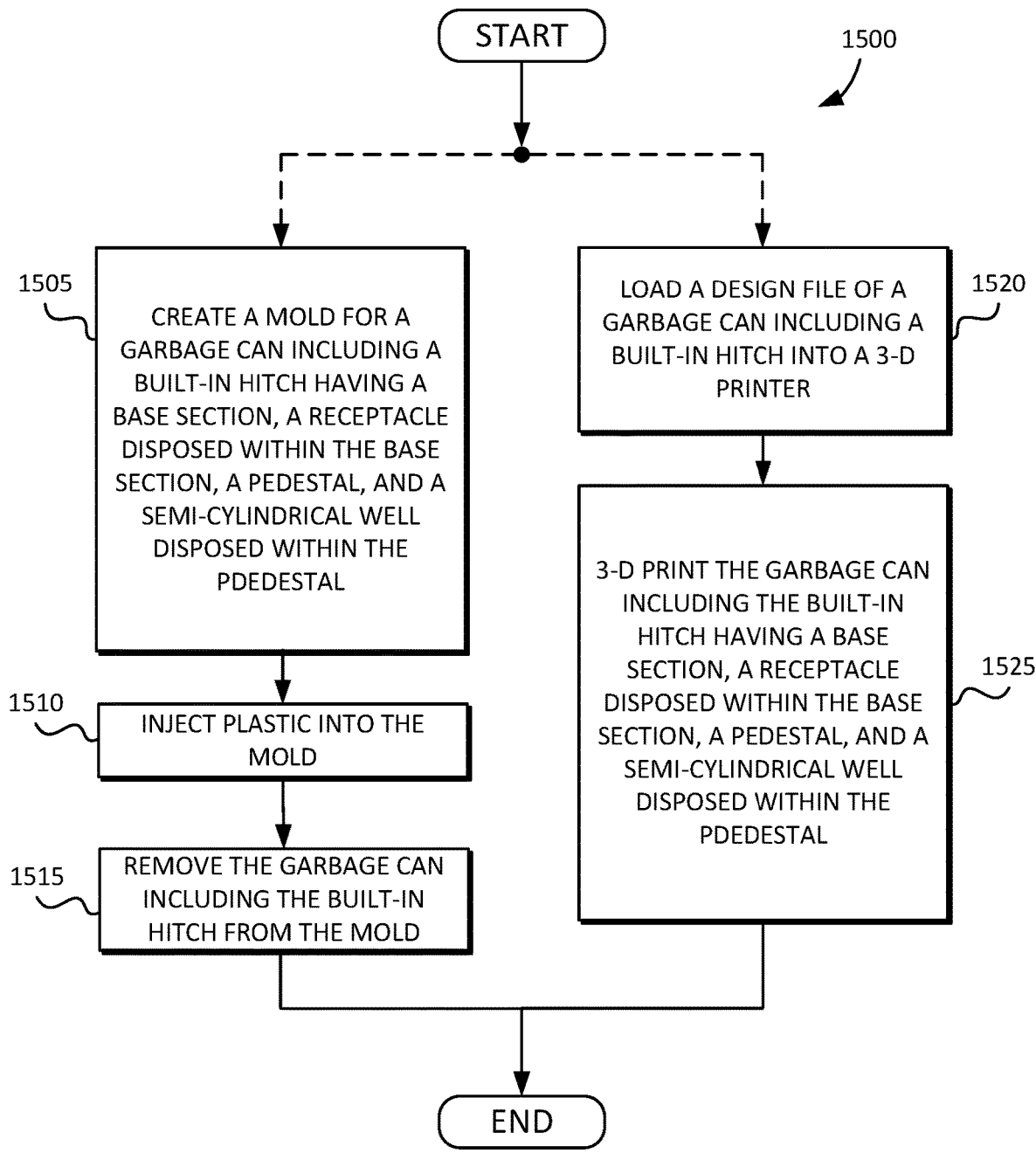
FIG. 15 is a flow diagram illustrating a technique for manufacturing a garbage can having a built-in hitch to tow the garbage can using a vehicle.

FIG. 15 is a flow diagram 1500 illustrating a technique for manufacturing a garbage can having a built-in hitch to tow the garbage can using a vehicle. At 1505, a mold can be created for a garbage can including a built-in hitch as described herein, e.g., having a base section, a receptacle disposed within the base section, a pedestal, and a semi-cylindrical well disposed within the pedestal. At 1515, plastic or another suitable hardening substance can be injected into the mold. At 1520, the garbage can including the built-in hitch can be removed from the mold.

Alternatively, at 1520, a design file of a garbage can including the built-in hitch can be loaded into a 3-D printer. At 1525, the 3-D printer can print the garbage can including, e.g., a built-in hitch as described herein, e.g., having a base section, a receptacle disposed within the base section, a pedestal, and a semi-cylindrical well disposed within the pedestal.

Some embodiments include a garbage can hitch, comprising a base section, a grab handle coupled to the base section, and an attachment arm coupled to the base section, and configured to attach to a garbage can. The garbage can hitch can include a receptacle disposed within the base section, and configured to receive a hitch ball of a vehicle. The garbage can hitch can include a semi-cylindrical well disposed within the base section, and configured to receive a handle bar of the garbage can.

In some embodiments, the attachment arm includes a first sidewall of the semi-cylindrical well, and the base section includes a second sidewall opposite the first sidewall of the semi-cylindrical well. In some embodiments, the receptacle includes a hollow cylindrical section. In some embodiments, the receptacle includes a hollow conical frustum section having a tapered wall. In some embodiments, the attachment arm includes a recess located at an underside thereof. In some embodiments, the attachment arm includes a vertical section and a horizontal section. In some embodiments, the horizontal section includes a lip. In some embodiments, the recess of the attachment arm and the lip are configured to be attached to a cross stiffener of the garbage can to prevent lateral movement of the garbage can hitch along a handle bar of the garbage can.

In some embodiments, the grab handle includes a first vertical sidewall, a second vertical sidewall, and a horizontal wall coupled to the first vertical sidewall and to the second vertical sidewall. In some embodiments, the base section, the attachment arm, and the receptacle are arranged in a gravity-enhanced configuration to provide downward levered pressure on the hitch ball responsive to the garbage can being attached to the vehicle. In some embodiments, the garbage can is attachable to the vehicle via the garbage can hitch, and the garbage can is configured to be dragged by the vehicle using the garbage can hitch. In some embodiments, the base section, the grab handle, the attachment arm, and the receptacle form a single contiguous part. In some embodiments, the single contiguous part is an injection molded single part made of plastic.

Some embodiments include a garbage can, comprising one or more sidewalls, and a built-in hitch attached to the one or more sidewalls. In some embodiments, the built-in hitch includes a base section, and a receptacle disposed within the base section, and configured to receive a hitch ball of a vehicle. The garbage can may further include a handle bar. The built-in hitch can include a pedestal coupled to the base section of the built-in hitch. The built-in hitch can include a semi-cylindrical well disposed within the pedestal of the built-in hitch, wherein the handle bar is held at least partially within the semi-cylindrical well.

In some embodiments, the receptacle includes a hollow cylindrical section. In some embodiments, the built-in hitch is attachable to the vehicle, and the garbage can is configured to be dragged by the vehicle using the built-in hitch. In some embodiments, the one or more sidewalls of the garbage can and the built-in hitch form a single contiguous part. In some embodiments, the single contiguous part is an injection molded single part made of plastic.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A garbage can hitch, comprising:
   a base section;
   a grab handle coupled to the base section;
   an attachment arm coupled to the base section, and configured to attach to a garbage can;
   a receptacle disposed within the base section, and configured to receive a hitch ball of a vehicle; and
   a semi-cylindrical well disposed within the base section, and configured to receive a handle bar of the garbage can.

2. The garbage can hitch of claim 1, wherein the attachment arm includes a first sidewall of the semi-cylindrical well, and the base section includes a second sidewall opposite the first sidewall of the semi-cylindrical well.

3. The garbage can hitch of claim 1, wherein the grab handle includes a first vertical sidewall, a second vertical sidewall, and a horizontal wall coupled to the first vertical sidewall and to the second vertical sidewall.

4. The garbage can hitch of claim 1, wherein the base section, the attachment arm, and the receptacle are arranged in a gravity-enhanced configuration to provide downward levered pressure on the hitch ball responsive to the garbage can being attached to the vehicle.

5. The garbage can hitch of claim 4, wherein the garbage can is attachable to the vehicle via the garbage can hitch, and the garbage can is configured to be dragged by the vehicle using the garbage can hitch.

6. A garbage can hitch, comprising:
   a base section;
   a grab handle coupled to the base section;
   an attachment arm coupled to the base section, and configured to attach to a garbage can;
   a receptacle disposed within the base section, and configured to receive a hitch ball of a vehicle;

wherein the receptacle includes a hollow cylindrical section; and wherein the receptacle includes a hollow conical frustum section having a tapered wall.

7. A garbage can hitch, comprising:

a base section;

a grab handle coupled to the base section;

an attachment arm coupled to the base section, and configured to attach to a garbage can; and a receptacle disposed within the base section, and configured to receive a hitch ball of a vehicle, wherein the attachment arm includes a recess located at an underside thereof.

8. The garbage can hitch of claim 7, wherein the attachment arm includes a vertical section and a horizontal section.

9. The garbage can hitch of claim 8, wherein the horizontal section includes a lip.

10. The garbage can hitch of claim 9, wherein the recess of the attachment arm and the lip are configured to be attached to a cross stiffener of the garbage can to prevent lateral movement of the garbage can hitch along the handle bar of the garbage can.

11. A garbage can hitch, comprising:

a base section;

a grab handle coupled to the base section;

an attachment arm coupled to the base section, and configured to attach to a garbage can;

a receptacle disposed within the base section, and configured to receive a hitch ball of a vehicle;

wherein the base section, the grab handle, the attachment arm, and the receptacle form a single contiguous part; and wherein the single contiguous part is an injection molded single part made of plastic.

12. A garbage can, comprising:

one or more sidewalls; and a built-in hitch attached to the one or more sidewalls, wherein the built-in hitch includes:

a base section; and a receptacle disposed within the base section, and configured to receive a hitch ball of a vehicle.

13. The garbage can of claim 12, further comprising:

a handle bar;

a pedestal coupled to the base section of the built-in hitch; and a semi-cylindrical well disposed within the pedestal of the built-in hitch, wherein the handle bar is held at least partially within the semi-cylindrical well.

14. The garbage can of claim 12, wherein the receptacle includes a hollow cylindrical section.

15. The garbage can of claim 12, wherein the built-in hitch is attachable to the vehicle, and the garbage can is configured to be dragged by the vehicle using the built-in hitch.

16. The garbage can of claim 12, wherein the one or more sidewalls of the garbage can and the built-in hitch form a single contiguous part.

17. The garbage can of claim 16, wherein the single contiguous part is an injection molded single part made of plastic.

* * * * *